No. 769,881. PATENTED SEPT. 13, 1904.
C. G. WALKER.
RUB ROLLER FOR VEHICLES.
APPLICATION FILED FEB. 3, 1904.
NO MODEL.

Witnesses
Inventor
C. G. Walker
Attorneys

No. 769,881. Patented September 13, 1904.

UNITED STATES PATENT OFFICE.

CHARLES G. WALKER, OF POULTNEY, VERMONT.

RUB-ROLLER FOR VEHICLES.

SPECIFICATION forming part of Letters Patent No. 769,881, dated September 13, 1904.

Application filed February 3, 1904. Serial No. 191,865. (No model.)

*To all whom it may concern:*

Be it known that I, CHARLES G. WALKER, a citizen of the United States, residing at Poultney, in the county of Rutland, State of Vermont, have invented certain new and useful Improvements in Rub-Rollers for Vehicles; and I do hereby declare the following to be a full, clear, and exact description of the invention, such as will enable others skilled in the art to which it appertains to make and use the same.

This invention relates to vehicles; and it has for its object to provide a roller in the place of the ordinary rub-iron, and which roller will be so constructed and arranged as to be engaged by the corresponding front wheel of the vehicle in turning, so that the tire of the wheel will bear flat against the roller, so that the wear on both the tire and the roller will be reduced to a minimum.

A further object of the invention is to provide a roller which will turn freely upon ball-bearings and in which the balls will be protected from dust.

Figure 1:
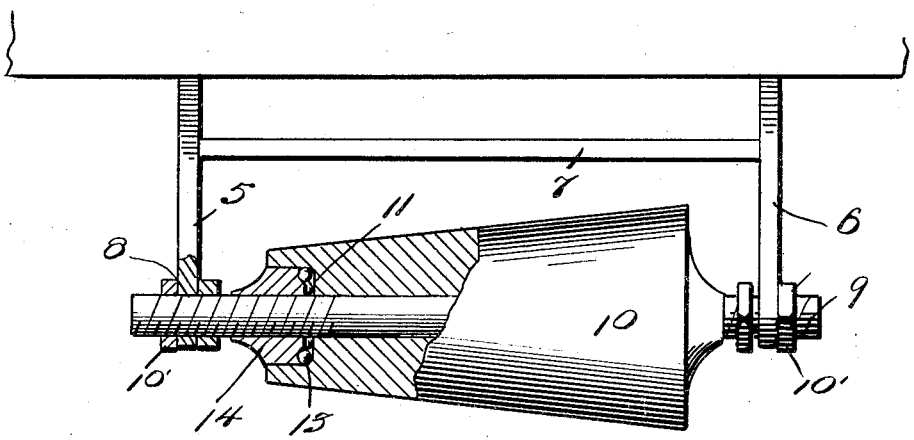
Figure 2:
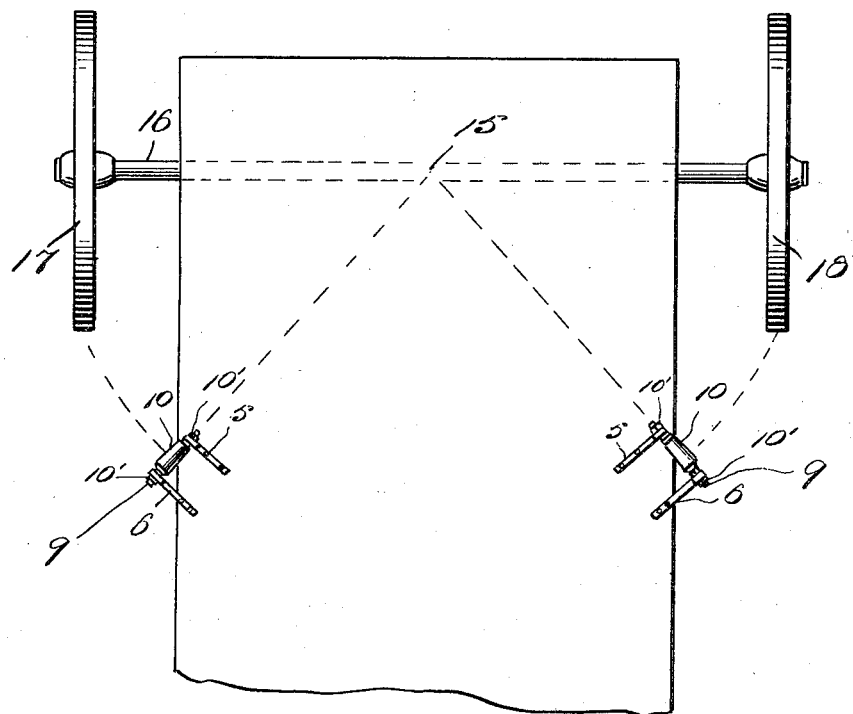

In the drawings forming a portion of this specification, and in which like numerals of reference indicate similar parts in both views, Figure 1 is a view, partly in section and partly in elevation, showing an embodiment of the invention. Fig. 2 is a diagram illustrating the positions of the rollers with respect to the body of the vehicle, the front wheels, and the king-bolt.

Referring now to the drawings, there is shown an embodiment of the invention comprising a frame including the brackets 5 and 6, having the cross-brace 7 connected above the ends thereof, and in the lower end portions of which brackets are the transverse alining perforations 8, which are designed to receive the axle 9 of a rub-roller 10. The end portions of the axle are threaded, and upon them are engaged nuts 10', which are screwed against the brackets 5 and 6, so as to hold the axle against longitudinal movement, the pressure of these nuts against the outer faces of the brackets being resisted by the brace 7, so that a single pair of nuts is all that is required to hold the axle securely.

In the ends of the roller 10 are the recesses 11, against the inner ends of which bear balls 13, the balls being held in contact with the races by the cones 14, which are screwed onto the axle 9 and which fit snugly, but rotatably, in the outer end portions of the recesses 11 to prevent passage of dust into the roller.

Upon reference to Fig. 2 of the drawings it will be noted that in placing the rub-rollers under the body of the vehicle they are arranged so that the continuation of their axes intersect the king-bolt of the vehicle, and it will be further noted upon reference to the drawings that each of the rollers is frusto-conical and tapered in the direction of the king-bolt 15, so that when the front axle 16 is turned either wheel 17 or 18 will engage the corresponding rub-roller flat and the roller will rotate freely with a minimum of friction between the contacting faces.

With the construction shown it will furthermore be understood that when a portion of the face of a roller becomes appreciably worn the shaft or axle 9 may be adjusted longitudinally in the brackets by manipulation of the nuts 10', so as to shift the roller, and thus present a new surface.

What is claimed is—

As an article of manufacture, a rub-roller for vehicles consisting of an integral hanger comprising laterally-spaced arms and a transverse brace between the arms between the ends of the latter, said arms having transverse alining perforations, a threaded axle slidably engaged in the perforations, adjusting-nuts engaged with the axle at both sides of each arm and adapted to impinge against the latter, a frusto-conical drum mounted loosely upon the axle between the arms and having races in its ends, bearing-cones secured onto the axle at the end of the drum, and bearing-balls between the cones and the corresponding races.

In testimony whereof I affix my signature in presence of two witnesses.

CHARLES G. WALKER.

Witnesses:
 WILLIAM H. ROWLAND,
 HORACE R. COULTEN.